July 2, 1935.  H. N. BURNS  2,007,071
GATE
Filed Jan. 10, 1934  2 Sheets-Sheet 1
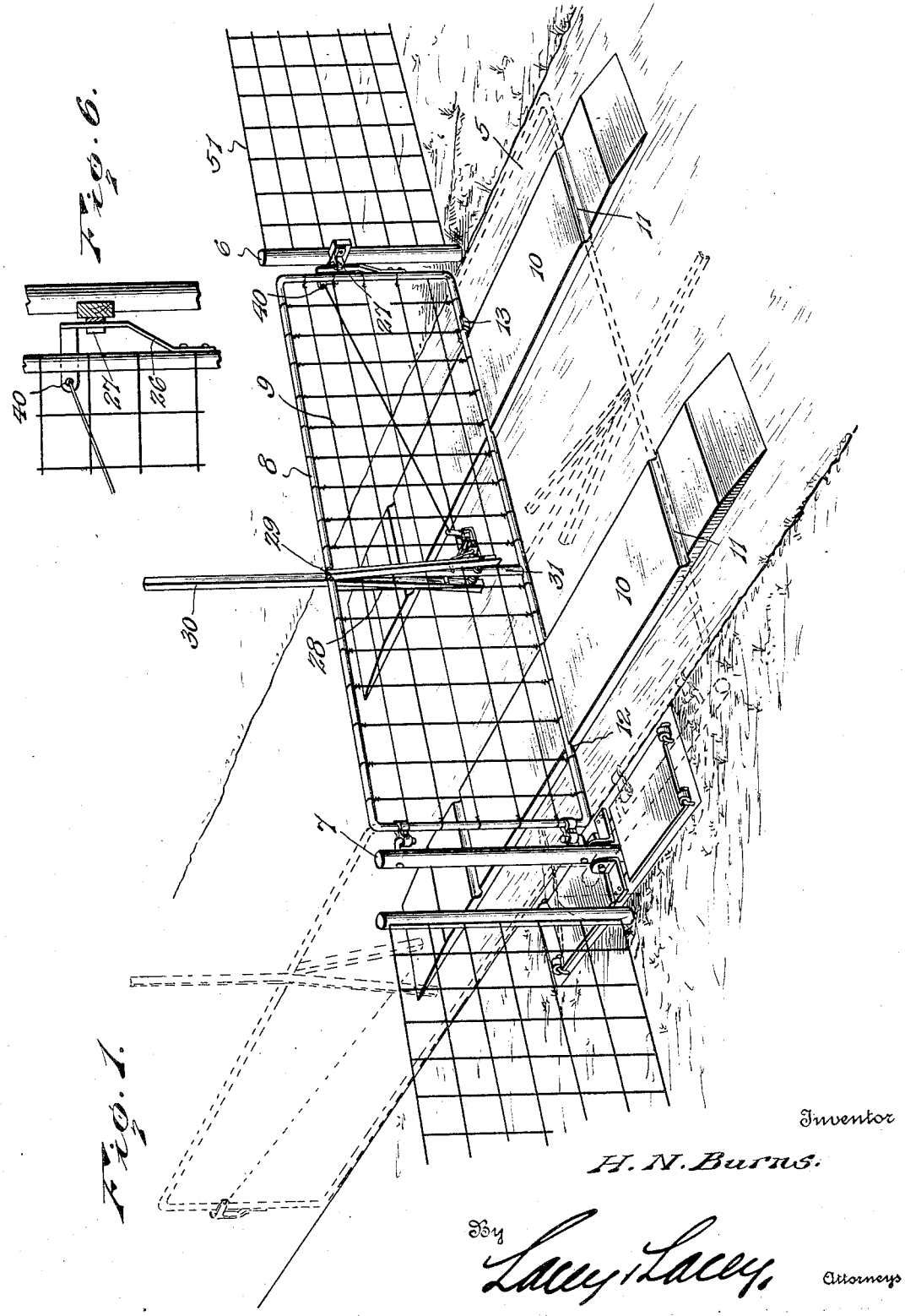
Inventor
H. N. Burns.
By Lacey & Lacey, Attorneys July 2, 1935. H. N. BURNS 2,007,071
GATE
Filed Jan. 10, 1934 2 Sheets-Sheet 2
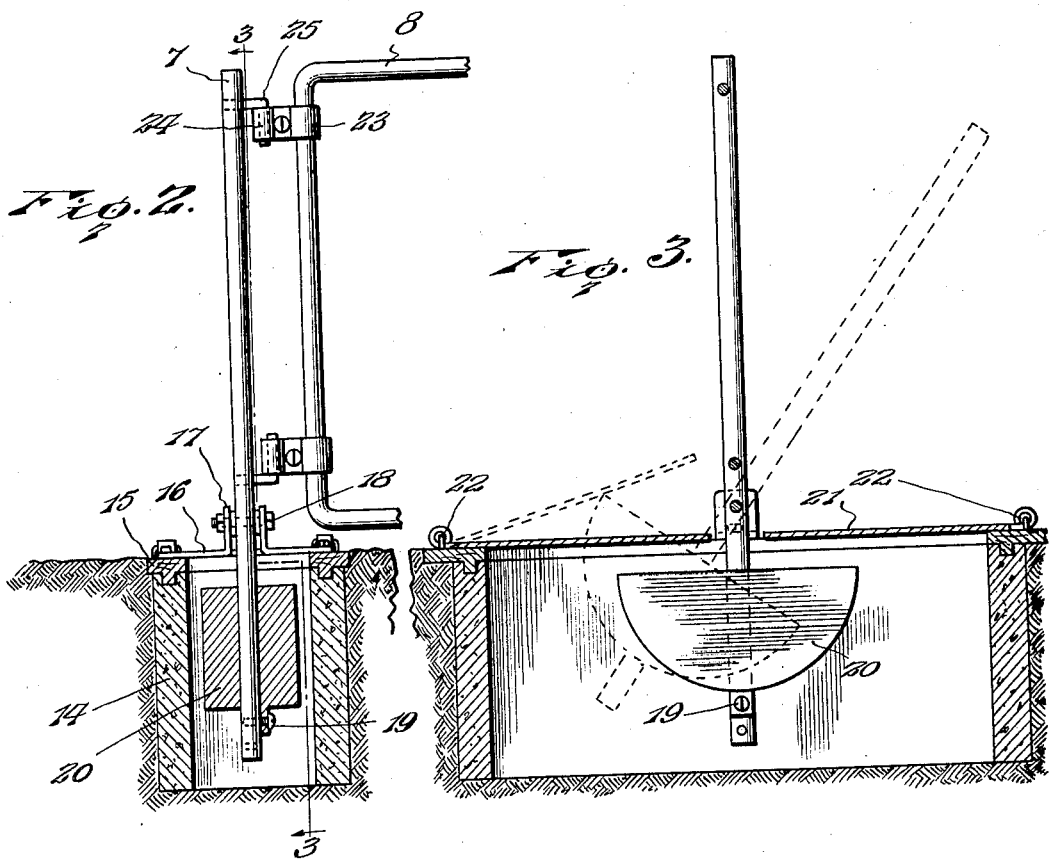
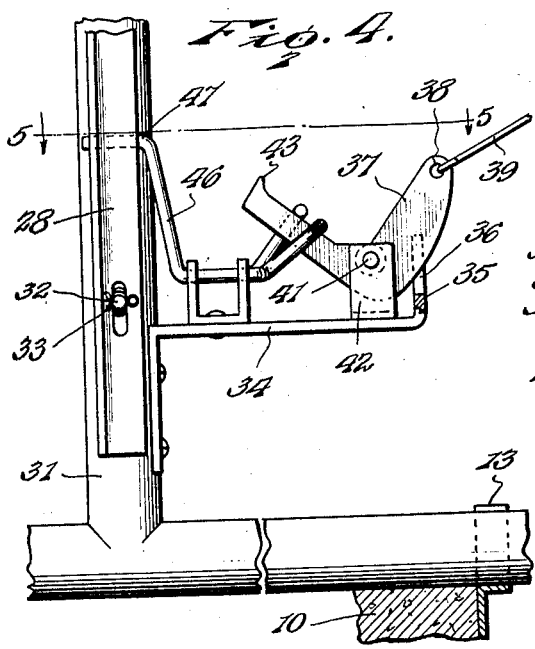
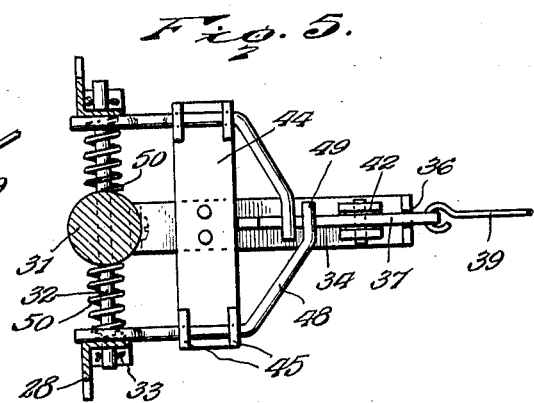

Patented July 2, 1935

2,007,071

UNITED STATES PATENT OFFICE 2,007,071

GATE

Henry N. Burns, Rossburg, Ohio

Application January 10, 1934, Serial No. 706,121

4 Claims. (Cl. 39—5)

This invention relates to gates and has for its object to provide a strong, durable and thoroughly efficient device of this character adapted to be positioned across a roadway and capable of being operated either manually or by an automobile or other motor driven vehicle traveling on said roadway.

A further object of the invention is to provide a gate mounted for both tilting and swinging movement and so constructed as to permit the gate to be swung laterally in either direction to open position to allow pedestrians to pass or downwardly in contact with the roadbed to permit the passage of a motor vehicle.

A further object is to provide a combination gate including a novel form of end post to which the gate is hinged for lateral swinging movement, said post being pivotally mounted for tilting movement and normally held in upright position by a counterweight connected with the lower end thereof and housed within a casing in the roadbed.

A further object is to provide a gate having oppositely disposed presser bars operatively connected with the gate latch through the medium of novel trip mechanism whereby pressure exerted on either of said bars will actuate the trip mechanism to release the latch and permit opening of the gate.

A still further object of the invention is generally to improve this class of devices so as to increase their utility, durability and efficiency.

In the accompanying drawings forming a part of this specification and in which similar numerals of reference indicate corresponding parts in all of the figures of the drawings, Figure 1 is a perspective view of a combined tilting and swinging gate constructed in accordance with the present invention, Figure 2 is a vertical sectional view of the movable hinge post showing the counterweight connected with the lower end thereof and operating in a casing in the roadbed, Figure 3 is a similar view taken on the line 3—3 of Figure 2, Figure 4 is an enlarged side elevation of one of the presser bars and the trip mechanism associated therewith, Figure 5 is a transverse sectional view taken on the line 5—5 of Figure 4, Figure 6 is a detail side elevation, partly in section, of the gate latch and keeper.

The improved combination gate, forming the subject-matter of the present invention, is shown extending across a roadway 5 and comprises a latch post 6 and a movable hinge post 7 between which is mounted a gate 8. The gate may be of any suitable or approved construction but is preferably formed of tubing bent into rectangular shape and connected by intersecting longitudinal and vertical wires 9 so that the gate will normally present a barrier to the passage of live stock, poultry and the like. Embedded in the roadway 5 and extending beneath the gate 8 are spaced tracks or runs 10 formed of cement or other suitable material, and these tracks are provided with transversely alined terminal seating grooves 11 and an intermediate seating groove 12, the latter groove being positioned directly beneath the gate and constituting a seat or bearing for the lower longitudinal edge of the gate, when the latter is swung downwardly to open position, as will be more fully described hereinafter.

If desired, an auxiliary bearing 13 may be positioned adjacent one of the tracks 10 to assist in guiding the gate during its tilting movement. Arranged at one side of the roadway 5 is a box or casing 14 preferably formed of cement and embedded in the ground directly below the hinge post 7. Wooden strips 15 are keyed in the upper edge of the casing 14 and secured to said strips are plates 16 having upstanding ears 17 between which is pivotally mounted the lower portion of the hinge post 7, said ears and post being pierced by a pintle pin or bolt 18 so as to permit free downward tilting movement of the post 7 under certain conditions. Disposed within the box or casing 14 and secured to the lower end of the post 7 by a screw or similar fastening device 19 is a counterweight 20 preferably arcuate in shape and which serves to normally hold the post 7 in upright position. It will thus be seen that the post 7 is free to swing downwardly in either direction when lateral pressure is applied to the gate and when the pressure is removed the weight will return the post to vertical position, as indicated by dotted lines in Figure 3 of the drawings. The top of the box or casing 14 is provided with oppositely disposed cover plates 21 which are pivotally mounted at 22 on the strips 15 and serve to prevent the entrance of dirt, snow, ice and the like to the interior of the box and which would have a tendency to interfere with the proper operation of the post.

Secured to one end of the gate 8 are spaced hinges 23 having terminal eyes 24 which receive pintle pins 25 carried by the post 7 so as to permit free lateral swinging movement of the gate in either direction in the usual manner. Secured to the other end of the gate 8 is a spring latch 26 which engages a keeper 27 mounted on the post 6 and which serves to hold the gate normally closed.

In order that the gate may be opened by a passing automobile or other motor driven vehicle, I mount on opposite sides of the gate, at the intermediate portion thereof, diverging presser bars 28 preferably formed of angle iron, as shown, although any other suitable material may be employed if desired. The upper ends of the presser bars are pivotally mounted at 29 on the upper rail of the gate 8 and one of said presser bars is extended longitudinally beyond the top of the gate to form an extension constituting a guard bar 30. Extending transversely through a center post 31 of the gate and also through the diverging ends of the presser bars 28 is a guide bar 32, the opposite ends of which are formed with eyes for the reception of cotter pins or similar fastening devices 33. Secured to one side of the center post 31, at the diverging ends of the presser bars 28, is a bracket 34 having a terminal upstanding guide lip 35, the free end of which is slotted at 36 and is adapted to receive the adjacent end of a bell crank lever 37. The short end of the lever 37 is provided with an eye 38 which receives the adjacent end of a rod or cable 39, the opposite end of which is connected at 40 with the spring latch 26 so that when a longitudinal pull is exerted on the rod 39 the latch will be released from its keeper and permit opening movement of the gate. The angle of the bell crank lever 37 is pivotally mounted at 41 between upstanding ears 42 carried by the bracket 34 and the long end of said lever is preferably provided with a terminal stop lip 43, as shown. Secured to the upper face of the bracket 34 and extending transversely of said bracket is a bar 44 having upstanding bearing ears 45 in which are journaled rocking levers 46. The inner ends of the rocking levers 46 are extended upwardly and thence laterally to provide horizontal contact fingers 47 which project in the path of movement of the presser bars 28 while the outer ends of the levers 46 are extended inwardly at 48 and terminate in overlapping fingers 49 which normally rest on the long arm of the bell crank lever 37, as best shown in Figure 5 of the drawings. Coil springs 50 are interposed between the center post 30 and the presser bars 28 and serve to normally and yieldably hold the lower ends of said presser bars in outwardly diverging relation to said center post.

When it is desired to open the gate manually, it is merely necessary to exert a longitudinal pull on the rod or cable 39 which releases the latch from the keeper so that by elevating the free end of the gate slightly to clear the groove 12 and bearing bracket 13 said gate may be swung laterally to open position, as indicated by dotted lines in Figure 1 of the drawings. During this manual opening of the gate, the counterweight 20 will hold the hinge post 7 stationary so that the gate may swing about its hinges without tilting said post. It is obvious that when the gate is moved to closed position, the latch will engage the keeper and hold said gate closed.

If an automobile or other motor driven vehicle is approaching the gate from either side of the fence 51, the bumper of the automobile will come in contact with the adjacent angle bar 28 and press said bar inwardly against the tension of the spring 50. As the presser bar moves inwardly, it will rock the adjacent lever 46 in its bearing 45 and cause the adjacent finger 49 to press downwardly on the long arm of the bell crank lever 37 thereby tilting said bell crank lever and through the medium of the rod 39 release the latch from the keeper 27. As the automobile continues to travel on the tracks or runs 10, said automobile will press the gate 8 together with the hinge post 7 downwardly against the roadway, as indicated by dotted lines in Figure 1 of the drawings, and in which position the upper bar of the gate will seat in the grooves 11. As the gate swings downwardly, the intermediate groove 12 and member 13 will form a bearing for the lower edge of the gate so as to permit easy tilting movement thereof. During the travel of the automobile over the tracks 10 it will hold the gate depressed and will continue to do so until the rear portion of the automobile clears the extension or guard 30. When the automobile clears the guard 30, the weight 20 will automatically return the hinge post 7 to upright position and the spring latch 26 will engage the keeper so as to hold the gate closed. As the hinge post 7 is tilted downwardly under the action of an automobile driven through the gate, the weight 20 will elevate the adjacent cover plate 21 so as to accommodate the weight and when the gate is returned to normal or upright position the cover plate 21 will drop by gravity so as to close the box or casing 14 and prevent the entrance of dust, dirt and other foreign matter thereto, as previously stated.

It will, of course, be understood that the gates may be made in different sizes and shapes and constructed of any suitable material without departing from the spirit of the invention.

From the foregoing description, it is thought that the construction and operation thereof will be readily understood by those skilled in the art and further description is deemed unnecessary.

While the gate is especially designed to be automatically opened by automobiles, it will, of course, be understood that said gate may be automatically opened by any motor driven vehicle equipped with a bumper.

Having thus described the invention, I claim:

1. A device of the class described comprising a casing adapted to be embedded in a roadway, brackets secured to the casing, a hinge post pivotally mounted for tilting movement between said brackets, a weight secured to the lower end of the hinge post and housed within the casing, hinged cover plates closing the top of the casing on opposite sides of the hinge post, and a gate hinged to the pivoted post.

2. A device of the class described comprising a casing adapted to be embedded in a roadway, strips secured to the upper edge of the casing, brackets secured to said strips, a post pivotally mounted between the brackets and having its lower end extended within the casing a weight housing within the casing and adjustably secured to the lower end of the pivoted post, cover plates having their outer ends pivoted to the strips and their inner ends free to move to open position by engagement with the weight when the post is tilted, and a gate hinged to the pivoted post.

3. A barrier adapted to extend across a roadway and comprising a stationary post on one side of the roadway, a pivoted post on the other side of the roadway, means for normally holding the pivoted post in upright position, tracks on the roadway and provided with transverse outer and intermediate seating grooves, the tracks being spaced apart throughout their entire length, and a gate disposed between the stationary and pivoted posts and having one end thereof hinged to said pivoted post and its lower edge normally seated in the intermediate groove.

4. A barrier adapted to extend across a roadway and comprising a stationary post disposed on one side of the roadway, a casing embedded in the ground on the opposite side of the roadway, brackets secured to the casing, a vertical post pivotally mounted on the brackets and having its lower end extended perpendicularly within the casing, a weight secured to the lower end of the pivoted post and housed within the casing for normally holding the pivoted post in upright position, longitudinal tracks disposed on the roadway and having their outer ends spaced apart and downwardly inclined, said tracks being provided with end and intermediate transverse seating grooves, a bearing disposed in alinement with the intermediate seating groove, and a gate disposed between the pivoted and stationary posts and having one end thereof hinged to the pivoted post and its lower end normally seated in the intermediate groove and bearing.

HENRY N. BURNS. [L. S.]